Oct. 28, 1941.  A. L. McKINNON ET AL  2,260,630
METHOD OF MAKING CHAINS
Filed June 24, 1939  2 Sheets-Sheet 1
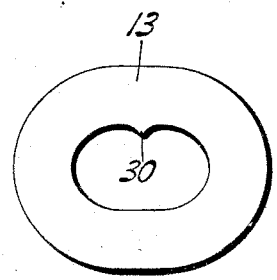
Fig. 1.
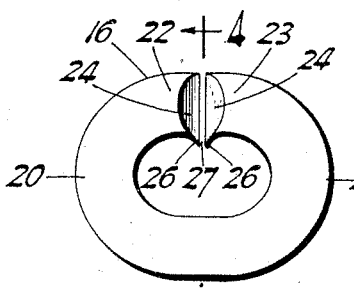
Fig. 2.
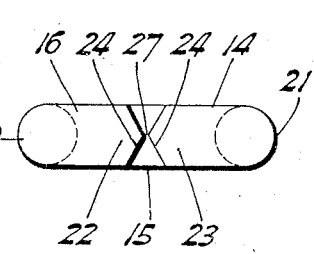
Fig. 3.
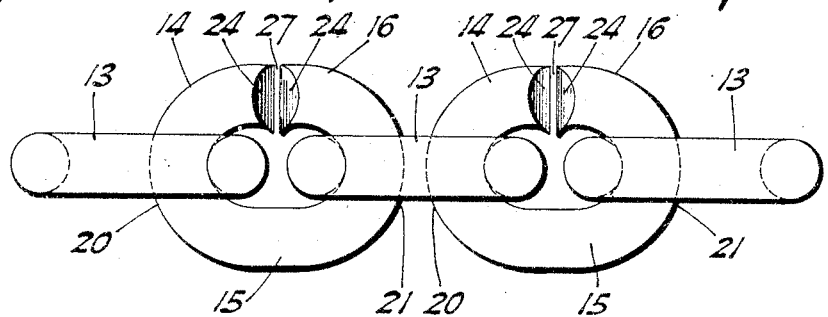
Fig. 5.
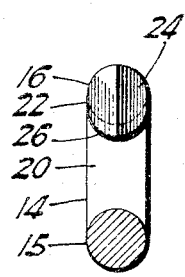
Fig. 4.
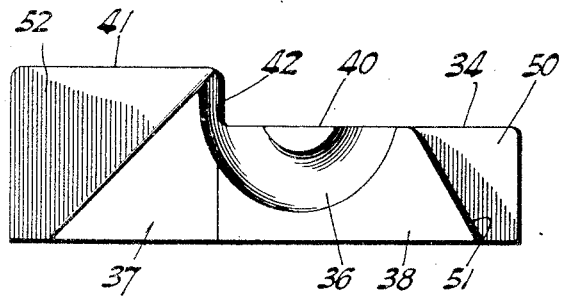
Fig. 6.
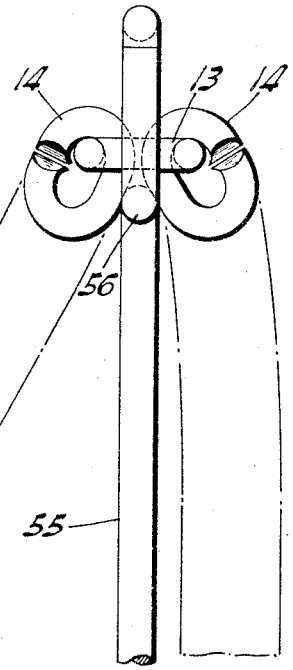
Fig. 7.
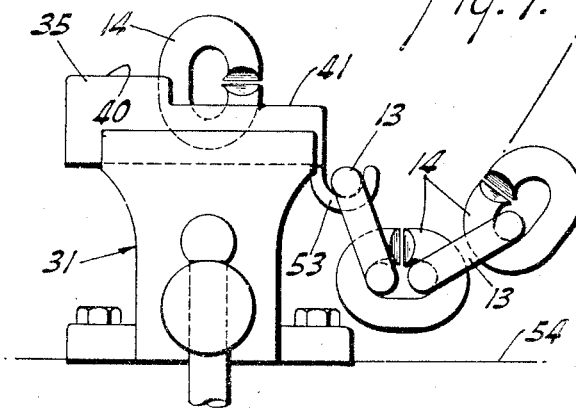
INVENTORS
ARCHIBALD L. McKINNON
AND OTTO W. WINTER
BY
Beau, Brooks, Buckley & Beau.
ATTORNEYS

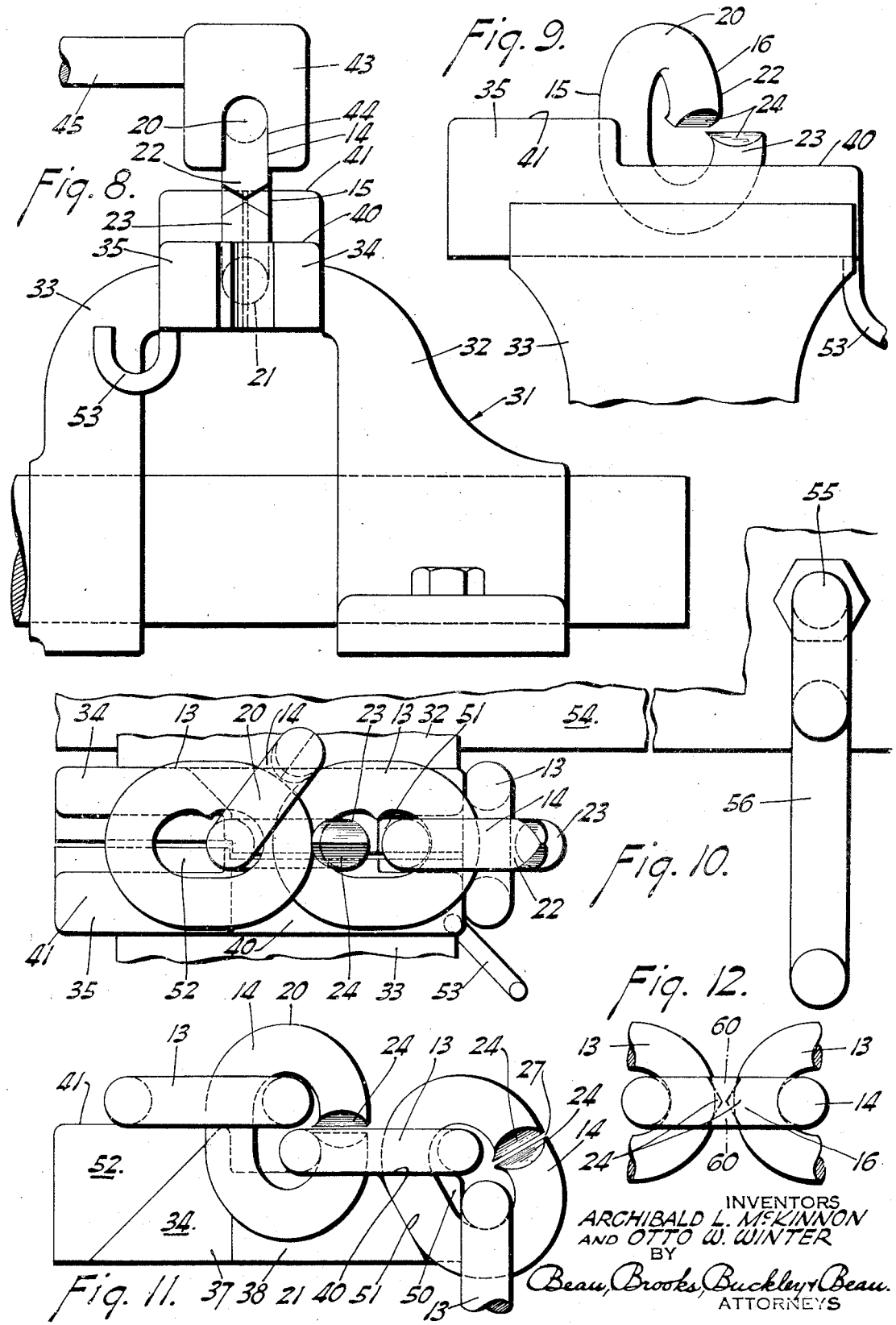

Patented Oct. 28, 1941

2,260,630

UNITED STATES PATENT OFFICE 2,260,630

METHOD OF MAKING CHAINS

Archibald L. McKinnon, St. Catharines, Ontario, Canada, and Otto W. Winter, Grand Island, N. Y., assignors to Columbus McKinnon Chain Corp., Tonawanda, N. Y., a corporation of New York Application June 24, 1939, Serial No. 281,042

11 Claims. (Cl. 59—31)

Our invention relates in general to a method of making chains, and in particular to a method of making chains which are formed from alloy steel and from stock of larger cross-sectional area, such as used in the making of the larger sizes of anchor or dredge chains, or the like.

It is well known to those skilled in the art that it has been the practice heretofore in making links from chain stock of the larger cross-sectional area, to provide a plurality of individual links formed from chain link stock bent by suitable means in the desired form and shaped with open ends, which are scarfed. After heating the scarfed ends to welding temperature, the links are assembled one at a time and each is immediately welded by a "fire weld" which consists, as is well known, in bringing such heated, scarfed ends together and forging them by a rapid hammering action while at such welding temperature.

The principal object of our invention has been to devise a method of making a chain in which alternate solid and split drop-forged links may be employed.

A further object of our invention has been to devise a method whereby a chain made of alternate solid and split drop-forged links will have the split drop-forged links opened for the reception of two adjacent closed or solid links, after which the split links are closed and subsequently welded, thereby providing a chain having only one-half of the links welded.

Moreover, it has been an object to unite the ends of the split links by means of the application of parent metal to such ends by the use of the atomic hydrogen method.

Furthermore, our method gives maximum strength to the chain and at the same time economy of manufacture.

The above objects and advantages have been accomplished by the method herein described and carried out by the links, chain and apparatus shown in the accompanying drawings, of which:

Fig. 1 is an elevation of one of the solid, drop-forged links used in the chain made by our method.

Fig. 2 is a similar view of a forged split link of the chain.

Fig. 3 is a side elevation of the link shown in Fig. 2.

Fig. 4 is an end sectional elevation of one of the split links taken on line 4—4 of Fig. 2.

Fig. 5 is a side elevation of a fragmentary portion of our chain made in accordance with the hereinafter described method.

Fig. 6 is a face view of one of the vise jaws of the apparatus used in carrying out our method.

Fig. 7 is a front elevation of the apparatus, showing one of the split links held in position for opening.

Fig. 8 is an end elevation of a portion of the apparatus shown in Fig. 7, illustrating a wrench in position to twist the upper end of the link.

Fig. 9 is a fragmentary, side elevation of a portion of the apparatus showing one of the split links in its twisted or open position ready to receive the solid links.

Fig. 10 is a fragmentary, plan view of the apparatus shown in Fig. 8 and illustrating two solid links and a split link in assembling position.

Fig. 11 is a side elevation showing the inner face of one of the vise jaws with one of the split links in its final position with the two adjacent solid links assembled therein.

Fig. 12 is a side elevation of a completed split link showing the V between the chisel-shaped edges filled in and closed with welding material.

While we have shown and described one form of apparatus for carrying out our method, it is obvious that other forms of apparatus may be employed for accomplishing the same results, the form illustrated in the drawings being shown for illustrative purposes.

Our method is designed particularly for the manufacture of chains of the heavier cross-section and made from solid and split drop-forged links alternately arranged. In such a chain therefore substantially one-half of the links are forged solid with the sides thereof closed in the form of an endless ring, as shown by the link 13 in Fig. 1. The other half of the links are split links and are each forged with the stock ends slightly separated by a gap 27, as shown by the link 14 in Fig. 2. The split link is formed with a solid side 15 and a split side 16 joined by link ends 20 and 21. The stock ends 22 and 23 formed on the split side 16 of the link, having the gap 27 therebetween, are arranged in substantial juxtaposition. Each of the stock ends 22 and 23 of each split link is formed with a tip 24 to facilitate welding, the specific shape of such tips depending upon what form of welding is to be employed in uniting them. In the form shown in the drawings, chisel-shaped tips are employed which are substantially symmetrical in shape and are tapered from an axial plane outwardly toward the periphery of the stock, which shape is best suited to the use of parent metal for filling in the V-shaped openings between such ends. Other forms of tips may be used, such as cone-shaped (not shown) if desired, but this forms no part of our invention and is therefore not further described.

It is customary in some forms of links to have the cross-sectional area through the welded portion greater than the cross-sectional area of the stock from which the link is made, and such reinforcement is preferably located on the inside of the link. To this end we provide each of the tips 24 with an inwardly extending projection 26 which is preferably semi-circular in form, as shown in Fig. 4, and which provides an inwardly extending reinforcement when the tips are joined by welding. So as to make the solid links 13 of the same shape as the split links 14, we provide each of them with a reinforcing projection 30 extending inwardly from one of the sides thereof.

As hereinbefore stated, the chain made in accordance with our method is constructed from a plurality of solid drop-forged links 13 and split drop-forged links 14. These links are alternately arranged as shown in Fig. 6, each split link connecting two adjacent solid links. In making the chain by our method, each of the split links is opened by separating the stock ends 22 and 23 either by rotating the link ends 20 and 21 relatively and in opposite directions upon an axis located preferably in the solid side 15 of the link or, if desired, by spreading the stock ends by a backward bending movement in the side 15. After the two solid links have been assembled in the opened split link, the stock ends of the link are closed up and moved into juxtaposition by a reverse movement of the link ends.

As hereinbefore stated, any suitable form of apparatus may be employed for carrying out our method and, for illustrative purposes, we have shown one form of apparatus in the accompanying drawings.

As shown in these drawings, the apparatus preferably comprises a vise 31 of the usual type having a stationary jaw 32 and a movable jaw 33. Clamping blocks 34 and 35 are provided which are fitted between and preferably secured to the vise jaws 33 and 32, respectively. The apparatus shown in the drawings is designed for opening the split link by the twisting action above referred to, and to this end the inner adjacent face of each of the clamping blocks is provided with a recess designed to fit and hold the lower end 21 of the link in clamped position. Each recess is formed with a semi-ring-shaped portion 36 and a connected, substantially cylindrical portion 42 extending upwardly therefrom.

The joint between the adjacent faces of the blocks is so formed that some space is left therebetween to insure firm clamping of the link. The faces at the joint are preferably formed by two surfaces 37 and 38 which are arranged in offset manner. The surface 37 is made to lie preferably at or near the centerline of the recess, and the surface 38 preferably lies off-center toward the block 35, whereby a greater area of supporting surface is provided in the block 34 than in the block 35 when clamping the lower end of the split link therebetween. By this arrangement sufficient surface will be provided for the lower end of the link to prevent mutilation thereof as the upper end is twisted in counter-clockwise direction.

The clamping blocks are provided with two horizontal supporting surfaces 40 and 41, the surface 41 being elevated above the surface 40 an amount preferably in excess of the diameter of the stock forming the link. The surfaces 40 and 41 are provided for the support of two solid links 13 while they are being united by means of one of the split links 14, to be hereinafter more fully described. In order to provide space between the clamping blocks for the split link next preceding the one being assembled, we provide a recess 50 in the adjacent faces of the blocks in which this completed split link may lie while the chain links are being assembled and while the clamped split link is being closed up. The bottom 51 of the recess is inclined at an angle to conveniently engage and loosely accommodate the link, as clearly shown in Fig. 11. If desired the opposite ends of the clamping blocks may also be provided with a recess 52 (see Fig. 6) for conveniently accommodating the link next to the end of a chain which is being united to another chain by means of our method. A downwardly extending hook 53 is preferably carried by one of the clamping blocks for temporarily holding the end of the chain, to be hereinafter described.

The vise 31 of the apparatus is preferably supported upon a suitable table or bench, the upper surface of which being represented by the line 54. Carried by this surface is a chain supporting rod 55 which extends upwardly and has a hook 56 carried at its upper end. The hook 56 is arranged some distance above the vise so that when the workman hooks the end of the chain on the hook 53, or when he removes the solid link 14 therefrom and assembles it with the clamped, opened, split link carried by the blocks, a good share of the weight of that portion of the chain between the hooks 56 and 53 will be carried by the rod 55.

In carrying out our method, which is particularly applicable to alloy steel chain stock of the larger sizes, we first heat each of the split links, one at a time, and then clamp each of them between the clamping blocks 34 and 35. When clamped, the link will have its major axis arranged in a substantially vertical plane, and the link end 21 will be held firmly in the recess 36 while the solid side 15 of the link will be supported by the recess 42. When so clamped, we apply a suitable wrench to the upstanding link end 20, and give to this end a twisting movement in either direction, but preferably in counter-clockwise direction, as shown in Figs. 9 and 10. As just stated, any suitable wrench may be employed but we prefer to use one comprising a block 43 having a recess 44 formed therein of a width equal substantially to the diameter of the stock and preferably having its inner surface semi-cylindrical to fit the curved surface of the end 20 of the link. To this block is attached an operating handle 45 which is made of sufficient length to enable a workman to exert sufficient twisting movement upon the solid end 15 of the link to open the stock ends 22 and 23. This twisting movement is carried on until the stock ends 22 and 23 are sufficiently separated to permit the passage of the solid links 13 therebetween. When the split link is twisted to the position shown in Figs. 10 and 11, one of the solid links 13 is threaded over the upstanding stock end 23 of the link and supported upon the surface 40 as shown in Figs. 10 and 11. Another of the solid links 13 is then threaded up about the stock end 22 and over the link end 20 to a point of engagement with the solid side 15 of the link, coming to rest upon the supporting surface 41. With the links thus assembled, the wrench or tool 43 is again placed upon the upstanding end 20 of the link, which is still hot, and the same is twisted back to a position of alignment where the stock ends 22 and 23 will be in juxtaposition. Should the ends 22 and 23 be separated too widely when they have been moved to a position of registration, the upper end 20 may be struck with a suitable swaging tool (not shown) to bring these ends in the desired and proper spaced relation to each other. After the ends of the split link have been returned to their position of registration, the parts appear as shown in Fig. 11. When assembling each successive group of links, the split link next preceding the one that is clamped will engage the recess 50 and be conveniently supported therein.

After the link held by the clamping blocks has been closed up and its ends are in proper registering position, the workman opens the clamping blocks to release the split link and removes such link from the engagement with the blocks preferably by grasping the closed link supported on the surface 41. This link is then engaged with the hook 53 for temporarily holding the end of the chain. By supporting the last closed link of the chain in this position, it is in convenient and readily accessible position for assemblage with the next split link after the same has been placed between the clamping blocks and its ends opened up, as hereinbefore described.

As hereinbefore pointed out, after the chain is formed, the split links are welded by any suitable means, but preferably by filling in the spaces between the ends with parent metal, as shown in Fig. 12 at 60, which may be applied by the use of the atomic hydrogen process.

While we specified the gripping of the split link 14 on its major axis and twisting the same around its solid side 15 to open the link for the reception of the solid links 13, it is obvious that the ends may be spread, as hereinbefore stated, without being twisted. It is also obvious that the split link may be suspended with its major axis in a horizontal plane and one or both ends twisted relatively to each other; and suitable apparatus may obviously be designed for holding the link in such position while it is twisted; and, furthermore, for thus supporting the solid forged links while the ends of the split link are brought back to juxtaposition.

These and other modifications of the details herein shown and described may be made without departing from the spirit of our invention or the general disclosure of our method as set forth by the appended claims.

Having thus described our invention, what we claim is:

1. A method of making a chain formed of a plurality of closed links and split links, consisting of heating each of said split links, twisting the closed side of each of said split links on its axis while heated, thereby providing a space between the ends thereof for the passage of a closed link, assembling two closed links within said opened split link, then closing said split link by bringing the ends thereof in juxtaposition, and then subsequently welding said split links.

2. A method of making a chain formed of a plurality of closed links and split links, consisting of heating one of the split links, twisting the closed side of said split link on its axis while hot, thereby opening the ends of the same, assembling two closed links within said opened split link, then supporting said closed links, one above the other, and then closing said split link while said closed links are so supported.

3. A method of making a chain formed of a plurality of closed links and split links, consisting of heating one of the split links, twisting the closed side of said split link on its axis while hot, thereby opening the ends of the same, assembling two closed links within said opened split link, then separately supporting said closed links, one above the other, and then closing said split link while said closed links are so supported.

4. A method of making a chain formed of a plurality of closed links and split links, consisting of heating each of the split links, firmly holding one end of a heated split link with its major axis in a vertical plane, twisting the closed side of each of said split links on its axis while heated, thereby providing a space between the ends thereof for the passage of a closed link, assembling two closed links within said opened link, and then twisting the closed side of said heated split link in reverse direction to a position where the ends thereof are in juxtaposition.

5. A method of making a chain formed of a plurality of closed links and split links, consisting of heating each of said split links, twisting the closed side of each of said split links on its axis while heated, thereby providing a space between the ends thereof for the passage of a closed link, assembling two closed links within said opened split link and then twisting the closed side of said heated split link in opposite direction, thereby closing the ends of the split link and bringing them in juxtaposition.

6. A method of making a chain formed of a plurality of closed links and split links, consisting of heating each of the split links, firmly holding one end of a heated split link, separating the ends of each of said split links while heated, thereby providing a space between the ends thereof for the passage of a closed link, assembling a closed link by passing the same between the opening of the spread ends of the split link and supporting the same in the lower portion of said split link, then assembling a second closed link by passing the same into the split link and supporting said second link in superimposed position over said first closed link, and then closing the ends of the split link and bringing them in juxtaposition.

7. A method of making a chain formed of a plurality of closed links and split links, consisting of heating each of the split links, firmly holding one end of a heated split link, separating the ends of each of said split links while heated, thereby providing a space between the ends thereof for the passage of a closed link, assembling a closed link by passing the same between the opening of the split ends of the split link and supporting the same in the lower portion of said split link, then assembling a second closed link by passing the same into the split link and supporting said second link in superimposed position over said first closed link, then closing the ends of the split link and bringing them in juxtaposition, removing said closed split link from its clamped position and supporting the second mentioned closed link in readily accessible position while another heated split link is being clamped in position and opened.

8. A method of making a chain formed of a plurality of solid closed links and a plurality of split links, each split link formed with its adjacent ends insufficiently spaced apart to permit the passage of the body of a solid closed link, consisting of heating each individual split link, twisting the closed side of said split link on its axis while being heated to provide a space between the ends of the link for the passage of a solid closed link, assembling two solid closed links within said split link after the ends thereof have been separated, and then closing said split link.

9. A method of making a chain formed of a plurality of solid closed links and a plurality of split links, said closed links and said split links being made from stock of relatively large cross-section, each split link formed with its adjacent ends insufficiently spaced apart to permit the passage of the body of a solid closed link, consisting of heating each individual split link, twisting the closed side of said split link on its axis while being heated to provide a space between the ends of the link for the passage of a solid closed link, assembling two solid closed links within said split link after the ends thereof have been separated, and then closing said split link.

10. A method of making a chain formed of a plurality of alternately arranged closed links and single piece split links each having but a single convolution, consisting of heating each of said split links, separating the ends of each of said split links while heated, thereby providing a space for the passage of a closed link, assembling two closed links within each split link, then closing such split link by bringing the ends thereof in juxtaposition, and then subsequently joining the ends of said split links directly together by welding.

11. A method of making a chain formed of a plurality of closed links and single piece split links each having but a single convolution, consisting of heating each of the split links, separating the ends of each of said split links while heated, thereby providing a space for the passage of a closed link, assembling a closed link by passing the same between the opening of the spread ends of the split link and supporting the same in the lower portion of said split link, then assembling a second closed link by passing the same into the split link and supporting said second link in superimposed position over said first closed link, and then closing the ends of the split link and bringing them in juxtaposition, and then subsequently joining the ends of said split links directly together by welding.

ARCHIBALD L. McKINNON.
OTTO W. WINTER.